United States Patent [19]
Olson

[11] 4,382,550
[45] May 10, 1983

[54] CENTRAL-PILLAR ASSEMBLIES FOR CENTER-PIVOT IRRIGATION APPARATUSES

[76] Inventor: Theodore V. Olson, P.O. Box 758, Atkinson, Nebr. 68713

[21] Appl. No.: 351,343

[22] Filed: Feb. 23, 1982

Related U.S. Application Data

[63] Continuation of Ser. No. 128,511, Mar. 10, 1980, abandoned.

[51] Int. Cl.$^3$ ............................................. B05B 3/02
[52] U.S. Cl. .................................... 239/177; 239/279; 239/710
[58] Field of Search ................. 239/177, 710, 718–721, 239/288, 279

[56] References Cited

U.S. PATENT DOCUMENTS

| 483,017 | 9/1892 | Rigby | 239/279 |
|---|---|---|---|
| 581,252 | 4/1897 | Quayle | 239/279 |
| 1,651,511 | 12/1927 | Cheney | 239/279 |
| 2,210,180 | 8/1940 | Richardson | 239/279 |
| 3,784,106 | 1/1974 | Ross | 239/177 |
| 3,802,627 | 4/1974 | Seckler et al. | 239/177 |
| 3,936,117 | 2/1976 | Reinke | 239/177 |
| 3,951,165 | 4/1976 | Seger et al. | 239/177 |
| 3,952,769 | 4/1976 | Ott | 239/710 |
| 4,033,508 | 7/1977 | Jacobi | 239/177 |
| 4,186,880 | 2/1980 | Jacobi | 239/177 |

Primary Examiner—Andres Kashnikow
Assistant Examiner—Michael J. Forman

[57] ABSTRACT

Sprinkler irrigation apparatus of the general type comprising a central-pillar assembly at the center-pivot site of the land tract to be irrigated, a generally horizontal lengthy water distributing conduit having spaced flexible couplings and nozzles and also traction supports at the terrain. The improved central-pillar assemblies herein disclosed, when utilized for electrically driven and controlled irrigation apparatus, have provision for the electrical commutation means to be located in elevation below the outlet-elbow means feeding the inward-end of the water distributing conduit. Electrical surveillance of the apparatus tract performance might also be initiated from nearby the low-elevation commutation means. The improved central-pillar assemblies might also be equipped with more efficient and utilitarian medial-piping feeding water to the conduit inward-end, the medial-piping arrangement being inherently sturdy whereby the need for external bracing is minimized. The central-pillar assemblies disclosed have provision for a primary-balljoint that minimizes stress to the elongate water distributing conduit as it traverses rough and uneven terrain.

9 Claims, 11 Drawing Figures

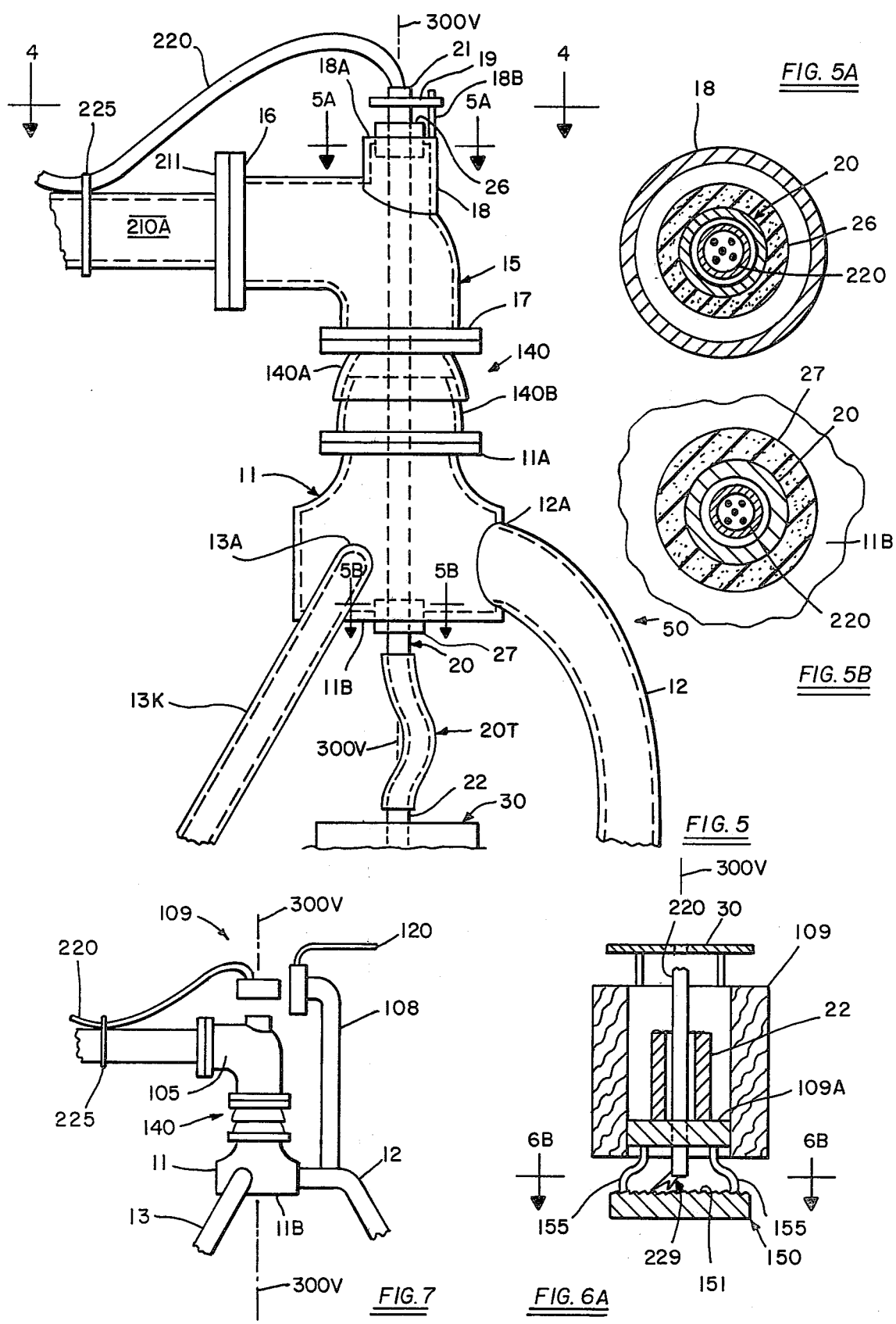

CENTRAL-PILLAR ASSEMBLIES FOR CENTER-PIVOT IRRIGATION APPARATUSES

This is a continuation of application Ser. No. 128,511, filed Mar. 10, 1980 now abandoned.

Objects and advantages of the present invention will be presented following treatment of drawing FIGS. 1 and 2 which schematically depict a typical prior art center-pivot sprinkler irrigation apparatus (200) including a lengthy water distributing conduit (210) having spaced water outlets e.g. nozzles 209. FIG. 1 schematically depicts a land tract "E" having the usual rectangular perimeter 300 and a geometric center at vertical-axis reference-line 300V, at which tract central site 300V there is a central-pillar assembly 100 including water delivery means for the conduit 210 inward-end 211. The water delivery means commences at inflow-pipe 100W and proceeds therefrom along medial-piping 102 to conduit inward-end 211. The typical water distributing conduit 210 extends radially outwardly from geographical vertical-reference 300V, there being underlying traction supports (S1, S2, . . . S(N−1), SN) spaced therealong. Since water inflow-pipe 100W almost invariably emanates from terrain "E" below conduit 210, conduit inward-end 211 necessarily derives water from some angular outflow-elbow means e.g. 105, located loftily above terrain "E". Thus, as lengthy water distributing conduit 210 travels overland around its center-pivot (300V) inward-end 211, its far-end 218 circumscribes an irrigatable geometric shape surrounding center-pivot 300V. If the lastmost traction support SN is steerable, as alluded to at SM and SW in FIG. 2, the irrigatable geometric shape circumscribed by far-end 218 might deviate beyond the circular shape 298 circumscribed by joint 217. For example, steerable wheels SW for lastmost support SN and steered from SM, would permit apparatus far-end 218 to avoid the land tract obstruction 299A (e.g. a fence-line) and 299T (e.g. a timberline). The double-headed curved arrow in FIG. 1 indicates that drive means DM and SM are reversible to reverse the angular direction of apparatus about central-axis 300V whenever encountering an obstacle e.g. fence-line 299A at angular position 297.

As schematically indicated in FIG. 2, electrical cable means (220) comprising a plurality of parallel electrical conductors might be periodically attached (at 225) and extend along the lengthy water distributing conduit 210 to control various functional components of the sprinkler irrigation apparatus 200. For example, certain conductors (e.g. 221) might control the dual-directional drive motors DM for the respective traction wheels "W" including on-off and forward-reverse; other conductors (e.g. 222) might control the steering of steerable traction wheels "SW"; another conductor (e.g. 223) might control the actuation of end-gun 219; and other conductors (not shown) might control various other apparatus components. Inasmuch as the water distributing conduit 210 and the co-extensive electric cable means 220 rotate around center-axis 300V, there is necessarily an electrical commutation means (e.g. 109) positioned adjacent vertical center-axis 300V to prevent kinking or twisting of the cable means at its juncture with incoming powerline 120. Traditionally, as exemplified in U.S. Pat. No. 3,784,106, the electrical commutation means has had to be relegated in elevation above the angular outflow-elbow means (105) where it is subject to inimical environmental influences and difficult to service and maintain. As seen in FIG. 2, the electrical commutation means has a non-rotatable brush holder portion 109B mounted upon an upright arm extension 108 from central-pillar bracing-framework 107, and the commutation means (109) armature portion 109A is physically attached to the cable means for co-rotation around vertical-axis 300V.

As also schematically indicated in FIG. 2, the terrain "E" is typically rolling or otherwise uneven whereby the various elongate segments (210A, 210B . . . 210N) of water distributing conduit 210 are traditionally connected together with rubber hoses or other terrain-responsive couplings 216-217. The number of such terrain-responsive couplings is multiplied according to the length of the water distributing conduit 210, thereby making the servicing of apparatus 200 both cumbersome and expensive.

As also schematically indicated in FIG. 2, the water medial-piping 102 leading upwardly from the water source (100W) terminus 103 to the outflow-elbow 105 typically concentrically surrounds vertical-axis 300V and is wholly relegated thereto. For example, a vertical-pipe 102, as the entire medial-piping surrounds vertical-axis 300V, is attached at its upper end to a rotatable coupling 101, rotatable in a single plane, and positioned below outflow-elbow 105. This prior art structure, also disclosed in U.S. Pat. No. 3,784,106, presents certain difficulties. For one, a supporting frame such as pyramidal concrete or external bracing 107 is required to maintain the vertical-pipe 102 stably surrounding vertical-axis 300V. Moreover, such supporting frameworks cannot be readily transported from one land tract to another, and if they are, are difficult to stably mount upon the pad "PE". In addition, medial-piping based exclusively upon a single vertical-pipe 102 surrounding vertical-axis 300V tend to deliver water turbulently or otherwise of unreliable flow rate to the outflow-elbow means (105).

It is accordingly the general object of the present invention to provide central-pillar assemblies for center-pivot irrigation apparatus that overcomes disadvantages and deficiencies of prior art structures.

It is one of the specific objectives of the present invention to provide central-pillar assemblies wherein the electrical commutation means might be located in elevation below the outflow-elbow means where it can be protected from the environment and more readily serviced.

It is another specific objective to provide central-pillar assemblies wherein there might be readily incorporated novel means for surveilling and programming the land tract performance of the lengthy irrigation apparatus with respect to the center-pivot vertical-axis thereof.

It is another objective to provide central-pillar assemblies wherein the water delivery means delivers water less turbulently and more efficiently to the inward-end of the lengthy irrigation apparatus.

It is yet another objective to provide central-pillar assemblies that minimizes stress to the irrigation apparatus as it traverses rough and uneven terrain.

It is still another objective to provide central-pillar assemblies which, though incorporating the aforedescribed advantages, might be economically made in readily portable form without sacrificing the required structural strength.

With the above and other objects and advantages in view, which will become more apparent as this description proceeds, the central-pillar assembly concepts of the present invention comprise, the medial-piping of the water delivery means, feeding the outflow-elbow means and thence to the inward-end of the water distributing conduit, being wholly laterally offset from the center-pivot vertical-axis to permit installation of cabinet means vertically below the outflow-elbow, the medial-piping desireably taking the optional form of slanting-pipes upwardly converging into a vessel located below the outflow-elbow; electrical commutation means, and possibly also co-rotational adjacent surveillance means, for the lengthy irrigation apparatus, the commutation or surveillance means or both being carried at the lower end of a drive-conduit surrounding the center-pivot vertical-axis and being co-rotatable with the outflow-elbow means; and primary-balljoint means surrounding the central-pivot vertical-axis below the outflow-elbow means, thereby minimizing stresses upon the terrain-responsive couplings of the lengthy overland water distributing conduit, there being means to maintain the commutation and surveillance means stably independent of the gyrating outflow-elbow thereabove.

In the drawing, wherein like characters refer to like parts in the several views, and in which:

FIG. 5 is an elevational view of a second embodiment central-pillar assembly;

FIG. 5A is a sectional plan view taken along line 5A—5A of FIG. 5;

FIG. 5B is a sectional plan view taken along line 5B—5B of FIG. 5;

FIG. 6A is a detail elevational view, showing a modification of the FIG. 3 embodiment, specifically including land tract surveillance means;

FIG. 7 is an elevational view of a third embodiment central-pillar assembly.

Figure 2:
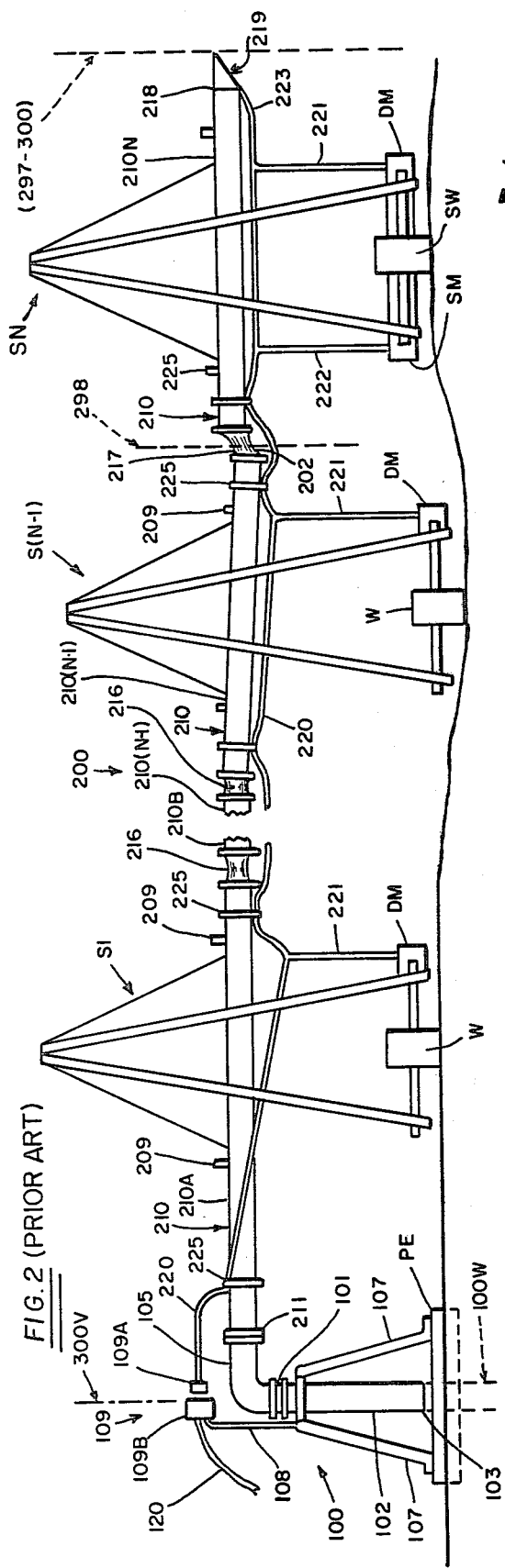
FIG. 2 is an elevational view of the FIG. 1 prior art.
Figure 4:
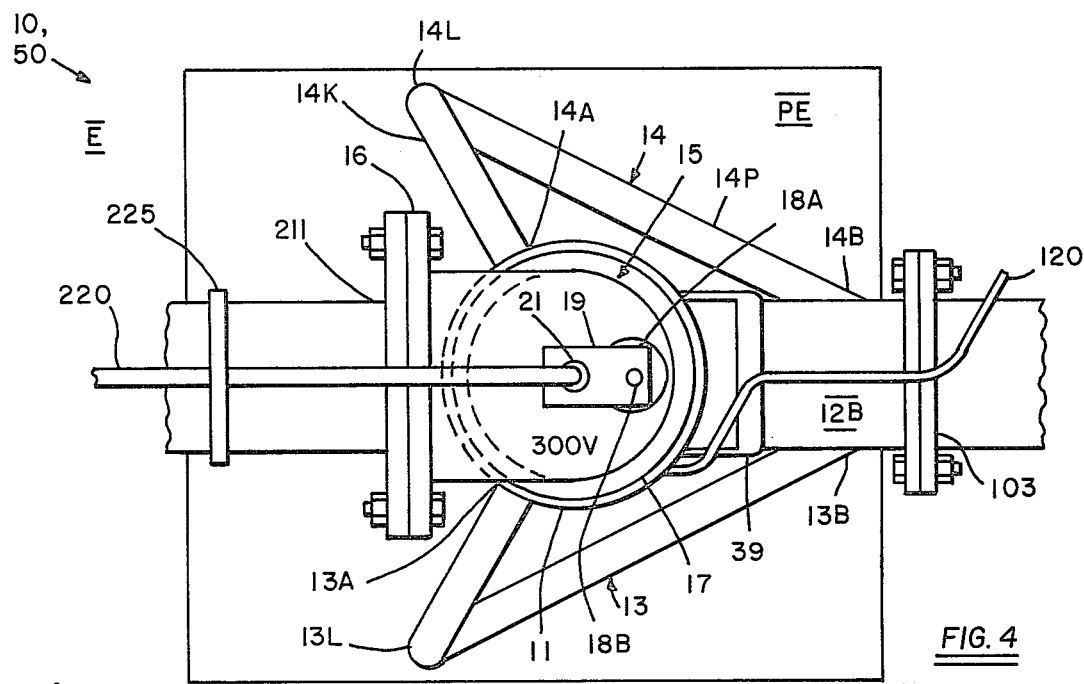
FIG. 4 is a plan view taken along lines 4—4 of FIGS. 3 and 5.
Figure 3:
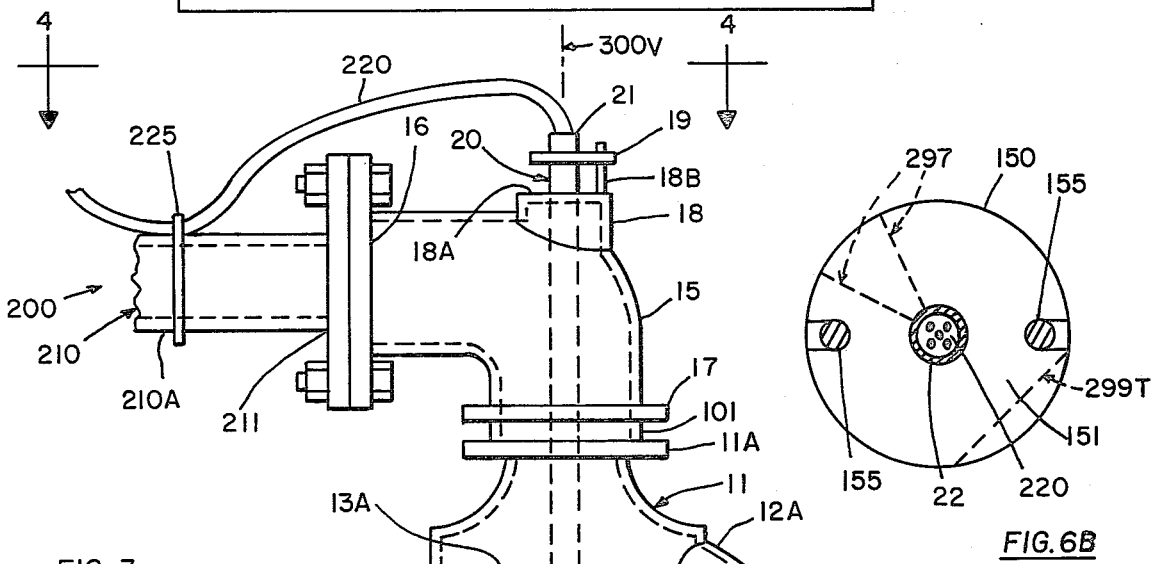
FIG. 3 is an elevational view of a first embodiment of the improved central-pillar assembly of the present invention.

Turning now to drawing FIGS. 3 and 4, which depict first embodiment 10 of the central-pillar assembly concept of the present invention. A comparison of the FIG. 3 elevational view with the FIG. 2 elevational view of typical prior art central-pillar 100, reveals several common features, namely: the flanged inward-end 211 of lengthy horizontal water distributing conduit 210 abutting the flanged outlet-end 16 of the loftily positioned outflow-elbow means (15, 105); the inflow-pipe 100W as the source for the water delivery means to inward-end 211; a uniplanar journal means 101 permitting lengthy water distributing conduit 210 to rotate as an arm around center-pivot vertical-axis 300V; incoming electrical powerline 120; and outgoing electrical cable means 220 extending along and periodically secured (225) to water distributing conduit 210. However, even a cursory comparison of FIGS. 3 and 2 reveals at least three prominent differences for central-pillar embodiment 10 as compared to the typical prior art central-pillar 100 of FIG. 2. A very prominent difference is that; in the prior art, the electrical commutation means (109) between powerlines 120 and 220 is located along vertical-axis 300V above the lofty outflow-elbow means (105); but, in the assembly 10 of FIGS. 3 and 4 the commutation means 109A–109B is located along vertical-axis 300V but below the outflow-elbow (e.g. 15). Another especially prominent difference is that; in the prior art, the water delivery medial-piping 102 physically concentrically surrounds and obscures the entire vertical extent of vertical-axis 300V between inflow-pipe 100W and the outflow-elbow means (105); but, in assembly 10, a significant proportion of the upwardly rising extent of the medial-piping beneath the outflow-elbow means (15) is wholly laterally offset from vertical-axis 300V, such as to provide room for a cabinet means (30) intersected by axis 300V below outflow-elbow 15. Another especially prominent difference is that; in the prior art, cumbersome bracing (107) externally of the medial-piping (102) is required to maintain the medial-piping stably concentrically surrounding vertical-axis 300V; but, in assembly 10, the upwardly convergent medial-pipes 12–14 themselves afford the predominant structural strength for upright central-pillar assembly 10.

In addition to pipe members 12–14, the laterally offset medial-piping disclosed for embodiment 10 comprises a hollow vessel 11 disposed loftily above pad "PE" and surrounding axis 300V immediately below the journal means (101, 104). The vessel 11 depicted has an upper flange 11A for removable joinder to the journal means (101, 140B) and a floor 11B. Each of the three pipes 12–14 is wholly laterally offset from vertical-axis 300V and slants upwardly convergently toward and ultimately enters (e.g. at 12A, 13A, 14A) into vessel 11. Thus, water delivered into vessel 11 through pipes 12–14 proceeds upwardly along vertical-axis 300V into the outflow-elbow 15 and finally feeding lengthy conduit inward-end 211. The uniplanar primary-pipe 12, which is of larger diameter than secondary-pipes 13 and 14, has lower end 12B joined to inflow-pipe 100W at 103 and upper end 12A secured to vessel 11. Secondary-pipes 13 and 14 are shown of angularly bent configuration including; medial-bend (13L, 14L), inlet-end (13B, 14B) communicating with and secured to primary-pipe lower end 12B, horizontal-legs (13P, 14P) adapted to stably rest upon pad "PE", and slanting-legs (13K, 14K) converging upwardly and inwardly to communicate interiorly (at 13A, 14A) with vessel 11. Inasmuch as pipes 12–14 are rigidly connected to each other and to vessel 11, which is in turn securely rotatably connected via journal 101 to the outflow-elbow 15, central-pillar assembly 10 is not only inherently structurally strong without the necessity for supplemental bracing (107), but it is also readily portable whenever temporarily disjointed from the inflow-pipe (100W) and lengthy conduit 210. Moreover, it has been determined that two or more pipes, upwardly converging into a surgetank-like vessel (11), delivers water less turbulently and more efficiently to the outflow-elbow means.

Surrounding center-pivot vertical-axis 300V is tubular drive-conduit 20, which is itself surrounded by outflow-elbow 15 and vessel 11. Drive-conduit 20 has an upper length portion revolvably and sealably secured at the outflow-elbow roof and a lower length portion 22 revolvably and sealably secured at vessel floor 11B. Electrical cable means 220 from conduit inward-end 211 proceeds downwardly into the drive-conduit top-end 21 (located above outlet-elbow 15), thence along axis 300V, finally terminating adjacent drive-conduit bottom-end 23 at armature 109A within cabinet means (30). Cabinet 30 is herein attached to primary-pipe 12 with strap 39 and has an openable door 31 to permit servicing of components 109A, 109B, 120, 150, 150C, etc. For example, within cabinet 30 might be located the electrical commutation means 109A–109B between incoming powerline 120 and electrical cable 220. As depicted in FIG. 3, the electrical brushes holder 109B is mountable to the cabinet and non-rotatably surrounds vertical-axis 300V and rotatable armature 109A. Armature 109A is co-rotatably mounted to bottom-end 23 of drive-conduit 20 and is appropriately electrically connected to respective parallel electrical conductors or cable (220).

There are inter-conduits connector means (e.g. 18B, 19) to ensure that the drive-conduit carrier for armature 109A is co-rotatable around vertical-axis 300V with lengthy water distributing conduit 210. The inter-conduits connector means depicted in FIGS. 3, 4, and 5, comprises a torque-arm 19 surrounding axis 300V and drive-conduit 20 and attached to that portion of drive-conduit 20 protruding upwardly from outflow-elbow roof 18A. The torque-arm 19 is also attached to outflow-elbow 15 at a position outward from central-axis 300V, such as through a pin 18B parallel to and offset from axis 300V and protruding upwardly from the outflow-elbow boss 18. The lower end 17 of outflow-elbow 15 is ordinarily removably joined to the journal means (101, 140A) whereby outflow-elbow 15 and lengthy conduit 210 will rotate around center-pivot vertical-axis 300V.

Central-pillar assembly embodiment 50 of FIG. 5 differs from embodiment 10 of FIG. 3 in that the single-plane journal means (101) of the prior art is replaced by a multi-planes primary-balljoint 140 comprising mating hemispherical parts 140A and 140B, with the improved result that the gyratable (140A) outflow-elbow 15 absorbs stresses exerted to lengthy water distributing conduit 210 by rough and uneven terrain "E". Corollary advantages from the substitution of single-plane journal means 101 with primary-balljoint 140 include: minimizing wear and servicing problems for the central-pillar assembly structural components and journalling means, and minimizing the number or complexity of terrain-responsive couplings 216 needed to be interposed along lengthy conduit 210.

However, if the primary-balljoint journal means (140) is employed in concert with the low-elevation (30) electrical commutation means (109A–109B), the gyratory (140A) outflow-elbow 15 causes the co-attached drive-conduit 20 to also gyrate and skew from vertical-axis 300V with the troublesome result that the co-rotatable armature 109A becomes improperly aligned with brushes holder 109B. In order to correct for the skewing from axis 300V of the co-gyrating outflow-elbow 15 and armature-carrying drive-conduit 20, corrective measures are employable. One independent corrective measure is to sever the lower length portion 22 from the remainder of drive-conduit 20 and to rejoin them below vessel 11 with an elongate flexible-tube 20T. Another independent corrective measure, though employable for better results in combination with the flexible-tube 20T, is alluded to in FIGS. 5A and 5B and comprises water-tight yieldable-connector means (e.g. 26, 27) surrounding drive-conduit 20 and extending therefrom to the vessel floor 11B and/or to the outflow-elbow roof 18A. Compressible gasket type yieldable-connector 26 is shown in sealing engagement with roof 18A, while similar compressible gasket 27 is in sealing engagement with vessel floor 11B. Moreover, one or both said compressible gaskets 26–27 might be replaced with secondary-balljoints yieldable-connectors having diameters smaller than primary-balljoint 140. As indicated in drawing FIG. 7, depicting the third embodiment central-pillar assembly, the corrective measures (e.g. 26, 27, 20T) are not necessary if the electrical commutation means (109) is in the prior art location above the outflow-elbow means (105).

Figure 6C:
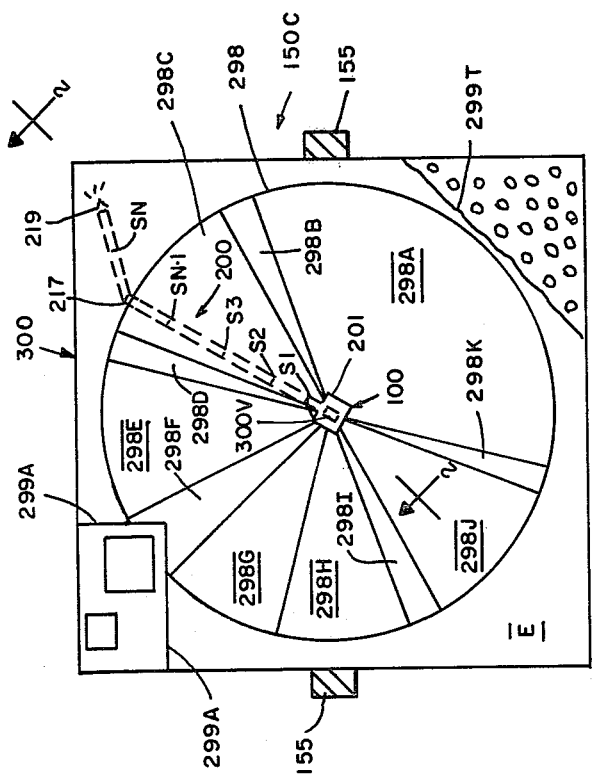
FIG. 6C is a view similar to FIG. 6B showing a more sophisticated embodiment.
Figure 1:
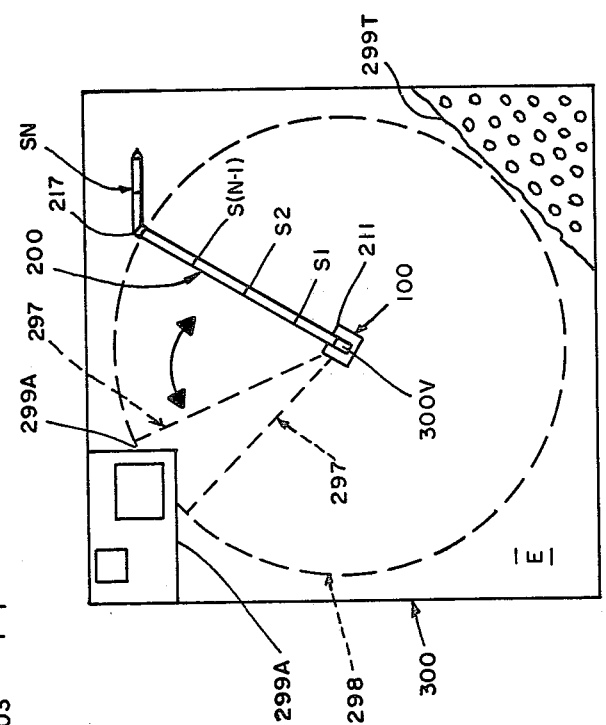
FIG. 1 is a schematic view in top plan of a typical prior art center-pivot type overland sprinkler irrigation apparatus.
Figure 6B:
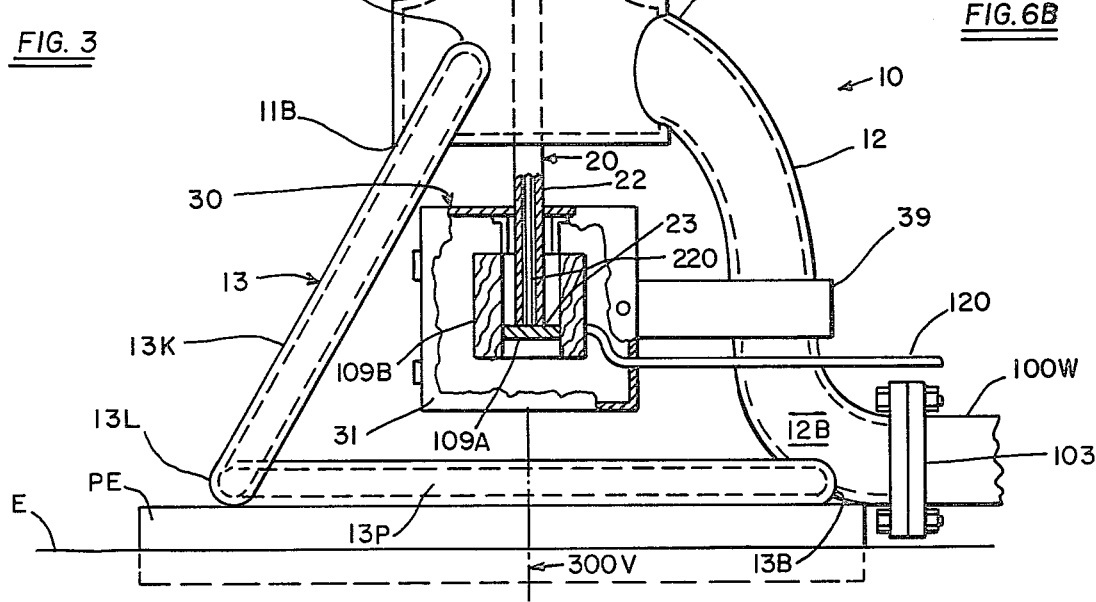
FIG. 6B is a sectional plan view taken along line 6B—6B of FIG. 6A.

As alluded to in FIG. 1 and in the second paragraph of this SPECIFICATION, functional performance of irrigation apparatus 200 relative land tract "E" is controllable through various electrical conductors (e.g. 221, 222, 223, etc.). FIGS. 6A and 6B refer to tractplan means 150 for initiating, from the site (300V) of the central-pillar assembly embodiments 10 and 50, surveillance and control of the land tract performance of center-pivot irrigation apparatus 200. The tractplan means (150) is a miniature disc-like map of the land tract features of FIG. 1 depicting (electronically or mechanically) at the disc upper surface 151 the performance (e.g. 221, 222, 223, etc.) demanded for the apparatus 200. Reading and monitoring of the map surface 151 can be accomplished through one or more of the conductor members (e.g. 229) of cable means 220, which selected conductors (229, etc.) depend below armature 109A. In this regard, disc-like map 150 is positioned below and made co-rotatable with armature 109A, such as by employing depending mounts 155. Thus, through the sensing of map or tractplan 150, such as by selected conductor members, surveillance and control of the tract performance for apparatus 200 can be initiated at vertical-axis site 300V, within the same protective housing 30. The tractplan 150C of FIG. 6C is more sophisticated and definitive than tractplan 150, in that differing sectorial performances (e.g. 298A–298K) are demanded by apparatus 200 and which must be further added to the tractplan for reading and monitoring by additional selected conductors of electrical cable 220.

From the foregoing, the construction and operation of the Central-Pillar Assemblies for center-pivot irrigation apparatuses will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a self-propelled sprinkler irrigation apparatus including a vertical-axis center-pivot located at a central-pillar assembly site of the land tract to be irrigated, said central-pillar site including water delivery means comprising a water inflow-pipe and outflow-elbow means located loftily above the land tract and further including medial-piping therebetween, a generally horizontal lengthy water distributing conduit extending radially outwardly from the center-pivot and communicating with the outflow-elbow means and having a plurality of underlying traction supports, the central-pillar assembly below the outflow-elbow means including journal means to permit the lengthy water distributing conduit to rotate around said vertical-axis center-pivot, an electrical pathway including incoming powerline and outgoing electrical cable means including a plurality of parallel electrical conductors, said electrical pathway including commutation means at the central-pillar and comprising a rotatable armature and a non-rotatable brushes holder to prevent twisting of the electrical pathway as the lengthy water distributing conduit and associated cable means rotates around said vertical-axis, the improvement comprising:
(a) a confluential vessel attached to and located below the central-pillar assembly journal means;
(b) an upright tubular drive-conduit surrounding said vertical-axis center-pivot and said parallel electrical conductors, said drive-conduit being surrounded by the journal means, the confluential vessel, and the entire upright heighth of the outflow-elbow means and being sealably associated with said outflow-elbow means, the armature portion of the commutator means being attached to the the drive-conduit below said confluential vessel;
(c) the upwardly rising extent of the medial-piping comprising at least two slanting-pipes converging into said confluential vessel, said medial piping further including horizontal portions extending from a lowermost end of the upwardly rising extent to the waterinflow pipe, said horizontal portions diverging from said waterinflow pipe and connected to said medial piping, and at least one medial piping further comprising at least one slanting pipe extending from said waterinflow pipe to said confluential vessel, all said slanting pipes and horizontal pipes providing waterflow communication between said waterinflow pipe and said confluential vessel and providing the support for the journal means thereabove, and all said slanting pipes being wholly laterally offset from said vertical-axis to provide space below the confluential vessel and the outflow-elbow means for the electrical commutation means; and
(d) inter-conduits connection means to cause the drive-conduit and the attached armature to co-rotate with said water distributing conduit around said vertical-axis center-pivot.

2. The structure of claim 1 wherein the inter-conduits connection means comprises a torque-arm connecting an upper portion of the outflow-elbow means to that portion of the drive-conduit protruding above the outflow-elbow means.

3. The structure of claim 2 wherein a cabinet means is non-rotatably attached at constant elevation to at least one of said slanting-pipes and surrounds the commutator means; and wherein the incoming powerline means enters the cabinet and is attached to a brushes holder component of the commutation means and which is non-rotatably secured within said cabinet.

4. The structure of claim 3 wherein the journal means comprises a primary-balljoint attached to and located below the outflow-elbow means and surrounding said drive-conduit, there being corrective means to ensure that the low elevational commutation means remains stably independent of the outflow-elbow means.

5. The structure of claim 4 wherein the corrective means comprises a flexible-tube lower segment for the drive-conduit and located in elevation below the primary-balljoint, the flexible-tube being located above and being co-rotatable with said armature lower segment.

6. The structure of claim 5 wherein the corrective means comprises yieldable-connector means surrounding the drive-conduit and extending therefrom to the roof wall of the outflow-elbow means.

7. The structure of claim 6 wherein the corrective means additionally comprises a yieldable-connector surrounding the drive-conduit and extending therefrom to the vessel floor.

8. The structure of claim 1 wherein there is a tractplan means located below and co-rotatably associated with the armature, at least one of the conductor members of the electrical cable extending below the armature and being in sensing engagement with the tractplan means.

9. The structure of claim 8 wherein the inter-conduits connection means comprises a torque-arm connecting an upper portion of the outflow-elbow means to that portion of the drive-conduit protruding above the outflow-elbow means and wherein the journal means comprises a primary-balljoint attached to and located below the outflow-elbow means and surrounding said drive-conduit, there being corrective means to ensure that the low elevational commutation means remains stably independent of the gyratable outflow-elbow means and drive-conduit.

* * * * *